(12) United States Patent
Tzeng et al.

(10) Patent No.: US 8,265,118 B2
(45) Date of Patent: Sep. 11, 2012

(54) CODE-MODULATED PATH-SHARING MULTI-SIGNAL SYSTEMS

(75) Inventors: Fred Tzeng, Cerritos, CA (US); Amin Jahanian, Irvine, CA (US); Payam Heydari, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 663 days.

(21) Appl. No.: 12/041,119

(22) Filed: Mar. 3, 2008

(65) Prior Publication Data
US 2008/0317160 A1    Dec. 25, 2008

Related U.S. Application Data

(60) Provisional application No. 60/894,582, filed on Mar. 13, 2007.

(51) Int. Cl.
*H04B 1/00*    (2006.01)

(52) U.S. Cl. ........ 375/130; 375/140; 375/141; 375/143; 375/146; 375/147; 375/152; 375/220; 375/260; 375/295; 375/316; 375/343; 375/349; 455/39; 455/91; 455/102; 455/130; 455/146; 455/225; 370/320; 370/335; 370/342; 370/441; 370/479

(58) Field of Classification Search ................ 375/130, 375/140, 141, 143, 146, 147, 152, 220, 260, 375/295, 316, 343, 349; 455/39, 91, 102, 455/130, 146, 225; 370/320, 335, 342, 441, 370/479

See application file for complete search history.

(56) References Cited

U.S. PATENT DOCUMENTS

| 4,575,861 | A | 3/1986 | Levreault |
| 7,406,261 | B2 * | 7/2008 | Shattil ............................. 398/76 |
| 2003/0193923 | A1 | 10/2003 | Abdelgany et al. |
| 2004/0114618 | A1 | 6/2004 | Tong et al. |
| 2005/0249298 | A1 * | 11/2005 | Kim et al. ..................... 375/260 |
| 2007/0025425 | A1 | 2/2007 | El Homsi et al. |
| 2007/0032266 | A1 | 2/2007 | Feher |

OTHER PUBLICATIONS

H. H. Nguyen and E. Shwedyk, "A new construction of signature waveforms for synchronous CDMA systems," *IEEE Trans. Broadcasting*, vol. 51, No. 4, pp. 520-529, Dec. 2005.
P. Cotae, "Multicell spreading sequence design algorithm for overloaded S-CDMA," *IEEE Commun. Lett.*, vol. 9, No. 12, pp. 1028-1030, Dec. 2005.
D. Shiung and J. Chang, "Enhancing the capacity of DS-CDMA system using hybrid spreading sequences," *IEEE Trans. Commun.*, vol. 52, No. 3, pp. 372-375, Mar. 2004.

* cited by examiner

*Primary Examiner* — Leon Flores
(74) *Attorney, Agent, or Firm* — Dickstein Shapiro LLP; Kenneth S. Roberts

(57) ABSTRACT

Described herein are code-modulated multi-signal systems. In one embodiment, a multi-signal system receives multiple input signals and code-modulates each input signal with a unique code to distinguish the input signal from the other input signals. The input signals may come from multiple antennas, multiple sensors, multiple channels, etc. The code-modulated signals are then combined into a combined signal that is sent through shared blocks and/or transmitted across a shared medium in a shared path. After shared processing and/or shared transmission, the individual signals are recovered using matched filters. Each matched filter contains a code corresponding to one of the unique codes for recovering the corresponding signal from the combined signal. The recovered signals may then be inputted to additional processors for further processing.

2 Claims, 14 Drawing Sheets

CODE-MODULATED PATH-SHARING MULTI-SIGNAL SYSTEMS

RELATED APPLICATION

This application claims the benefit of provisional application 60/894,582 filed on Mar. 13, 2007, the specification of which is incorporated in its entirety herein by reference.

FIELD OF THE INVENTION

The present invention related generally to multi-signal systems, and more particularly to code-modulated path-sharing multi-signal systems.

BACKGROUND INFORMATION

Multi-signal systems are used in many applications that require processing multiple signals and/or transmitting multiple signals. Applications include multi-antenna systems for wireless communications in which multiple signals are received from multiple antennas, and multi-sensor systems in which multiple measurements are taken from multiple sensors.

For example, the use of multi-antenna systems has emerged as a great innovation success in modern wireless communications. By exploiting space as the extra dimension, traditionally problematic multi-path propagation is transformed into a key advantage. In particular, the benefits of multi-input multi-output (MIMO) communications, including array gain, diversity gain, spatial multiplexing gain, and interference reduction are achieved at no extra increase in spectrum. This has prompted vast amounts of research in MIMO for high data rates, enhanced quality of service (QoS), and improved reliability for future generations of wireless communications.

However, a drawback of current multi-antennas systems is that multiple RF chains, baseband blocks and analog to digital converters need to be duplicated for each antenna. Consequently, considerable increases in power consumption and chip area, both of which are expensive commodities in densely integrated systems, are required.

Therefore, there is a need for multi-signal systems that overcome drawbacks of current multi-signal systems including multi-signal systems that propagate multiple signals through shared blocks to reduce power consumption and chip area.

SUMMARY

Described herein are code-modulated path-sharing multi-signal system that overcome drawbacks of prior art systems.

In one embodiment, a code-modulated path-sharing multi-signal system receives multiple input signals and code-modulates each input signal with a unique code to distinguish the input signal from the other input signals. The multiple inputs signals may come from multiple antennas, multiple sensors, multiple channels, or the like. The code-modulated signals are then combined into a combined signal that is sent shared blocks and/or transmitted across a shared medium in a shared path. After shared processing and/or shared transmission, the individual signals are recovered using matched filters. Each matched filter contains a code corresponding to one of the unique codes for recovering the corresponding signal from the combined signal. The recovered signals may then be inputted to additional processors for further processing.

The multi-signal system can be used for any application that requires processing and/or transmitting multiple signals. For example, the system can be used to process multiple signals using shared hardware instead of separate signal chains. This greatly reduces the size, power consumption, and complexity of the system, especially in applications using a large number of signals. This also reduces complexity by eliminating the coupling between components in multiple signal chains. Moreover, the shared signal path of the combined signal alleviates the problem of complex signal distribution and routing in multi-signal architectures.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. It is also intended that the invention is not limited to require the details of the example embodiments.

BRIEF DESCRIPTION OF THE FIGURES

The details of the invention, including fabrication, structure and operation, may be gleaned in part by study of the accompanying figures, in which like reference numerals refer to like segments.

DETAILED DESCRIPTION

Figure 1:
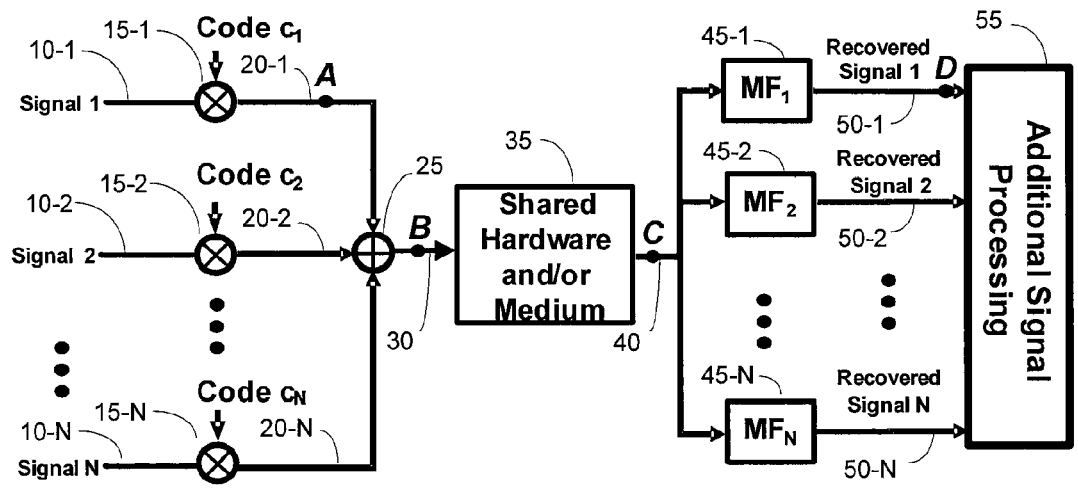
FIG. 1 shows block diagram of a code-modulated path-sharing multi-signal system according to an embodiment of the invention.

FIG. 1 shows a block diagram of a code-modulated path-sharing multi-signal system for processing a plurality of signal 10-1 to 10-N according to an embodiment of the present invention. The signals 10-1 to 10-N inputted to the system may come from multiple antennas, multiple sensors, multiple channels or the like. The system comprises a plurality of code modulators 15-1 to 15-N, in which each code modulator 15-1 to 15-N receives one of the signals 10-1 to 10-N and modulates the corresponding signal 10-1 to 10-N with a unique code $C_1$ to $C_N$. The unique codes assigned to the code modulators 15-1 to 15-N can be either orthogonal (i.e., Hadamard) or non-orthogonal codes, of binary or M-ary complexity.

The multi-signal system further comprises a signal summer 25 that combines the code-modulated signals 20-1 to 20-N from the code modulators 15-1 to 15-N into combined signal 30. As a result, the signals 10-1 to 10-N are multiplexed in the combined signal 30, in which each signal 10-1 to 10-N in the combined signal 30 is distinguishable from the other signals 10-1 to 10-N by its unique code and can be recovered from the combined signal using the corresponding code.

The combined signal 30 is then sent through shared hardware and/or shared transmission medium 35. The shared hardware may include an amplifier, filter, or other shared signal processor. The shared medium may include air, water, an optical fiber, a human body, a conductor such as a coaxial cable, wires or other shared conductive path. To transmit the combined signal 30 across the shared medium, the system may include components for converting the combined signal 30 into a form that can be transmitted across the shared medium. For example, when the shared medium is air, the system may include an RF antenna and associated hardware at each end of the shared medium.

The multi-signal system further comprises a plurality of matched filters 45-1 to 45-N that receive the combined signal 40 at the other end of the shared hardware and/or shared medium 35. Each matched filter 45-1 to 45-N contains a code corresponding to one of the unique codes for recovering the corresponding signal 50-1 to 50-N from the combined signal. Each recovered signal 50-1 to 50-N corresponds to one of the input signals 10-1 to 10-N. The recovered signals 50-1 to 50-N are then inputted to additional signal processing 55 for further processing.

The multi-signal system can be used for any application that requires processing and/or transmitting multiple signals. For example, the system can be used to process multiple signals using shared hardware instead of separate signal chains. This greatly reduces the size, power consumption, and complexity of the system, especially in applications using a large number of signals. This also reduces complexity by eliminating the coupling between components in multiple signal chains. Moreover, the shared signal path of the combined signal alleviates the problem of complex signal distribution and routing in multi-signal architectures.

Figure 2:
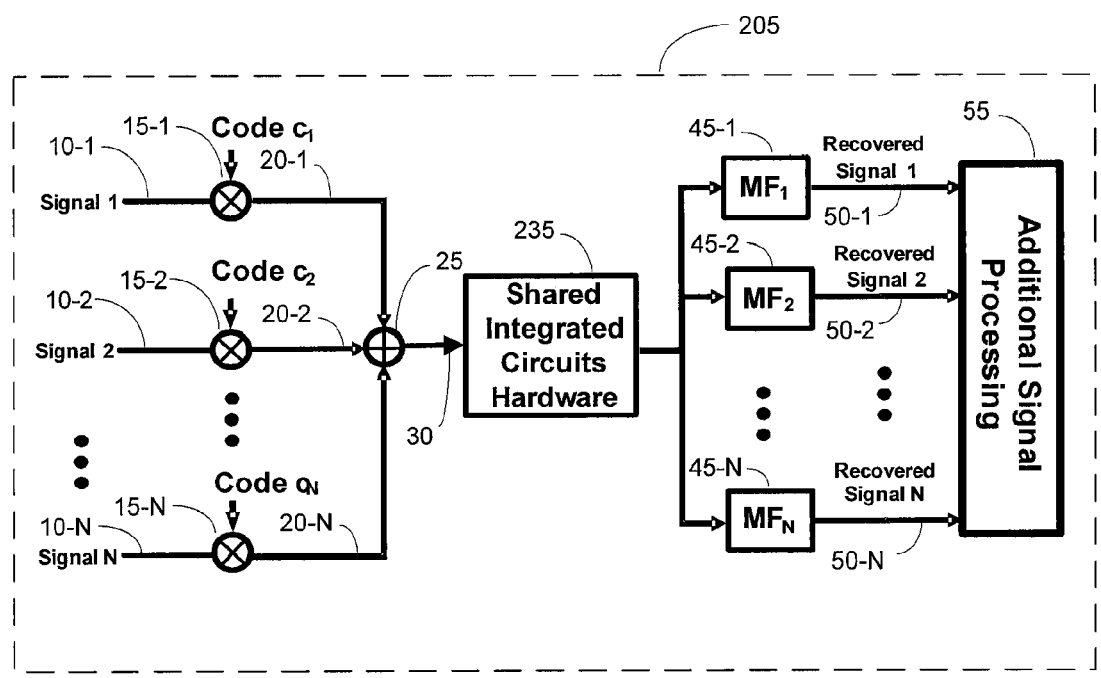
FIG. 2 shows block diagram of a multi-signal system where code-modulation and code-demodulation take place within an integrated circuit according to an embodiment of the invention.

FIG. 2 shows a block diagram of a multi-signal system, in which the code-modulation and code-demodulation take place within an integrated circuit 205 according to an exemplary embodiment of the present invention. In this embodiment, the code-modulators 15-1 to 15-N, shared circuits 235, and matched filters 45-1 to 40-N are integrated on the same chip. For example, the code-modulators 15-1 to 15-N, shared circuits 235, and matched filters 45-1 to 40-N may be fabricated on the same semiconductor (e.g., silicon) substrate using known integrated circuit (IC) techniques (e.g., a CMOS process).

The code-modulators 15-1 to 15-N distinguish the inputted signals 10-1 to 10-N with unique codes before they are combined by signal summer 25 into combined signal 30. The combined signal 30 is then processed by the shared integrated circuits 235 in a shared path. After shared processing, each signal is recovered by the matched filter 45-1 to 45-N containing its corresponding code. The recovered signals 50-1 to 50-N are then inputted to additional signal processing 55 for further processing.

Figure 2A:
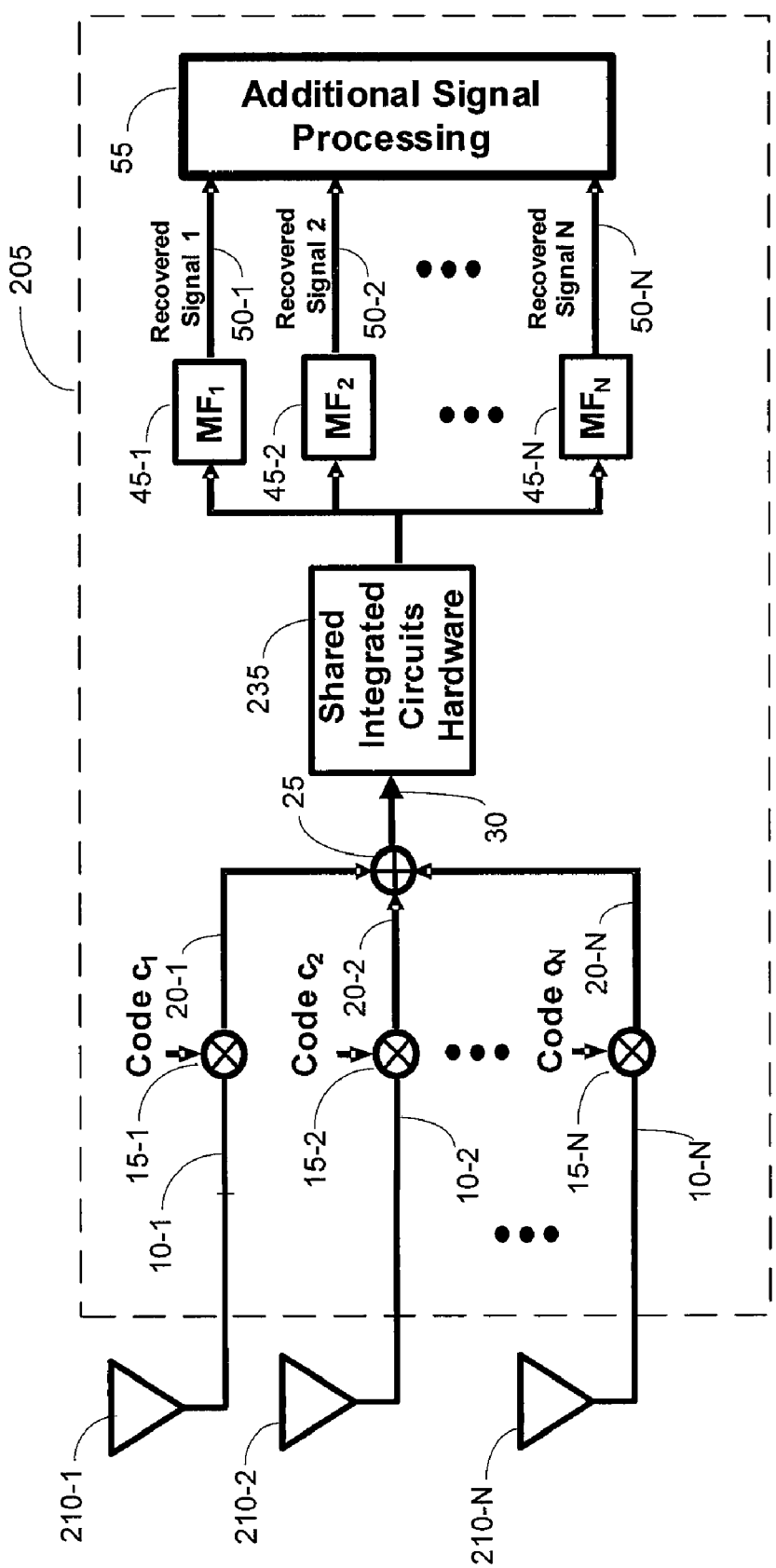
FIG. 2A shows block diagram of a multi-signal system comprising multiple antennas according to an embodiment of the invention.

FIG. 2A shows an exemplary embodiment of the integrated system, in which the signals 10-1 to 10-N come from multiple antennas 210-1 to 210-N. Each code-modulator 15-1 to 15-N is coupled to one of the antennas 210-1 to 210-N for receiving the corresponding signal 10-1 to 10-N. The antennas 210-1 to 210-N may be integrated on the chip or external to the chip. The system may also include an amplifier and/or other receiving hardware (not shown in FIG. 2A) in each receiving path. This embodiment may be used, e.g., in wireless multi-antenna receiver. An example of a code-modulated multi-antenna receiver is provided later.

Figure 2B:
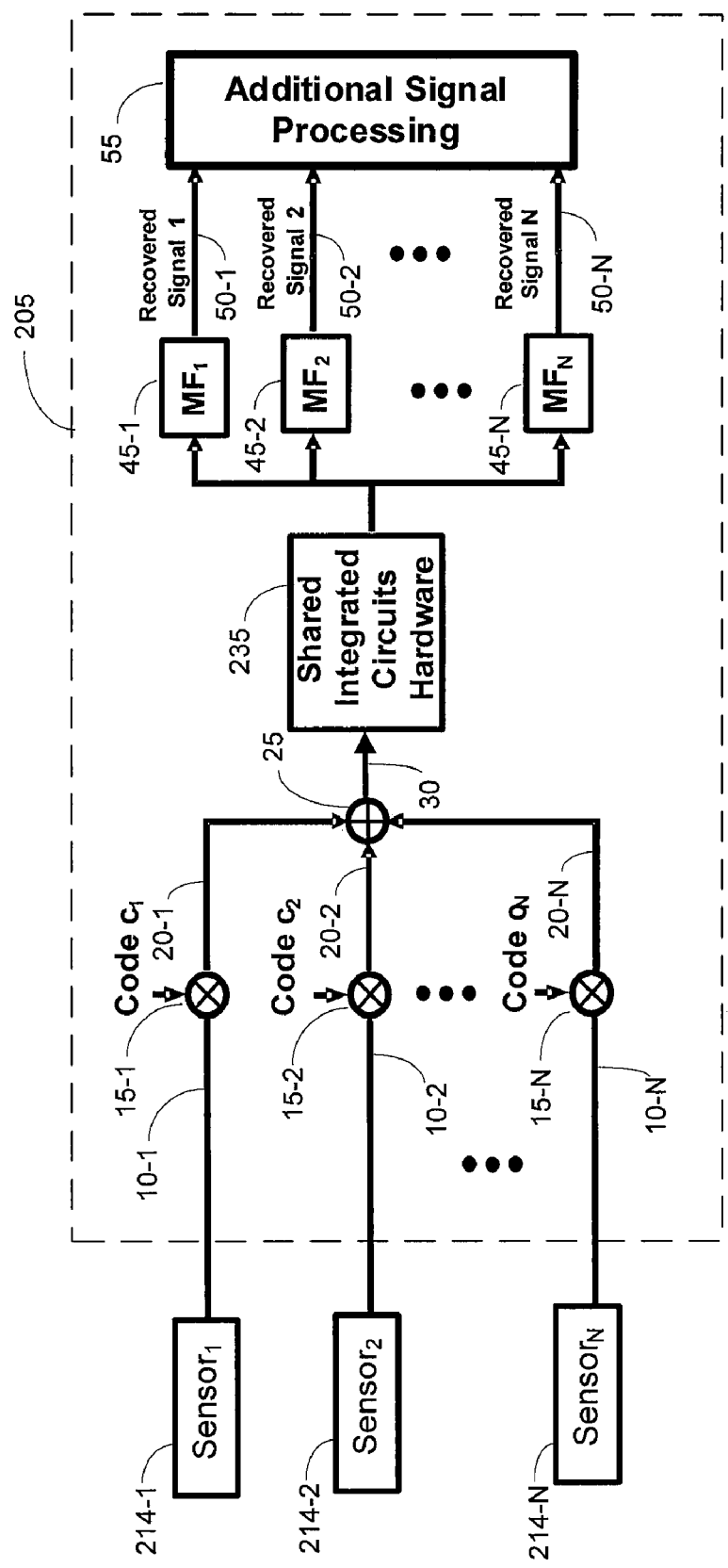
FIG. 2B shows block diagram of a multi-signal system comprising multiple sensors according to an embodiment of the invention.

FIG. 2B shows another exemplary embodiment of the integrated system, in which the signals 10-1 to 10-N come from multiple sensors 214-1 to 214-N. The multiple sensors 214-1 to 214-N may comprise, e.g., multiple microelectrodes used to measure neural activity or other electrical activity in an organism, gas/chemical sensors, tactile sensors, a DNA sensor array, an ultrasound sensor array, etc. The sensors may be integrated on the chip or external to the chip.

Figure 3:
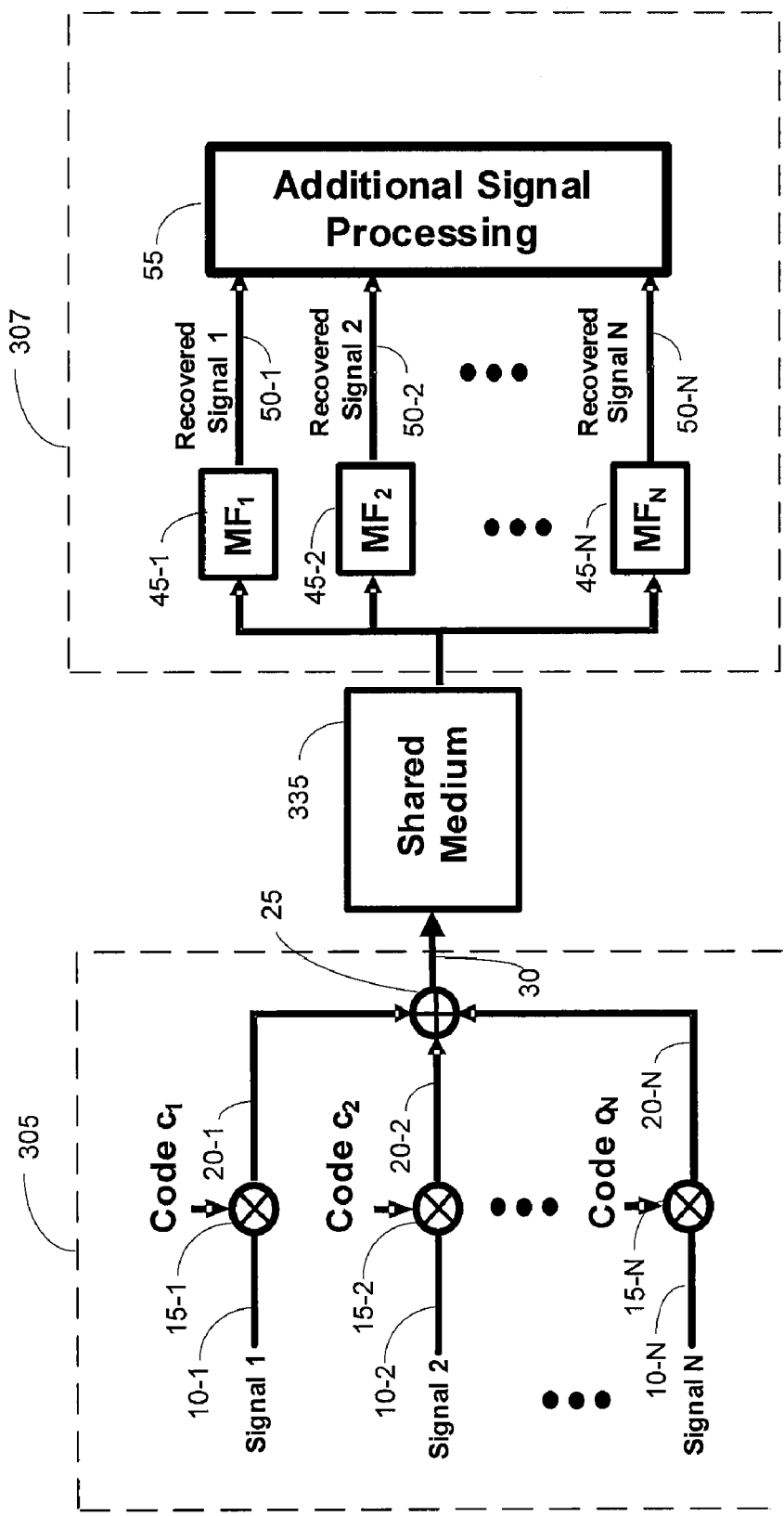
FIG. 3 shows block diagram of a multi-signal system where multiple signals are combined and transmitted across a shared medium according to an embodiment of the invention.

FIG. 3 shows a block diagram of a multi-signal system, in which the combined signal is transmitted across a shared medium 335 according to an exemplary embodiment of the present invention. In this embodiment, the code-modulators 15-1 to 15-N and signal summer 25 are placed on a first integrated circuit 305, and the matched filters 45-1 to 45-N are placed on a second integrated circuit 307 separated from the first integrated circuit 305 by the shared medium 335. The shared medium 335 may be air, water, an organism's body, etc. The shared medium may also be a shared transmission line, a fiber optic, etc. In this embodiment, the first integrated circuit 405 may be used in an efficient hand-off unit that gathers data from a site of interest and transmits the data to a central processor unit across the shared medium 335.

Figure 3A:
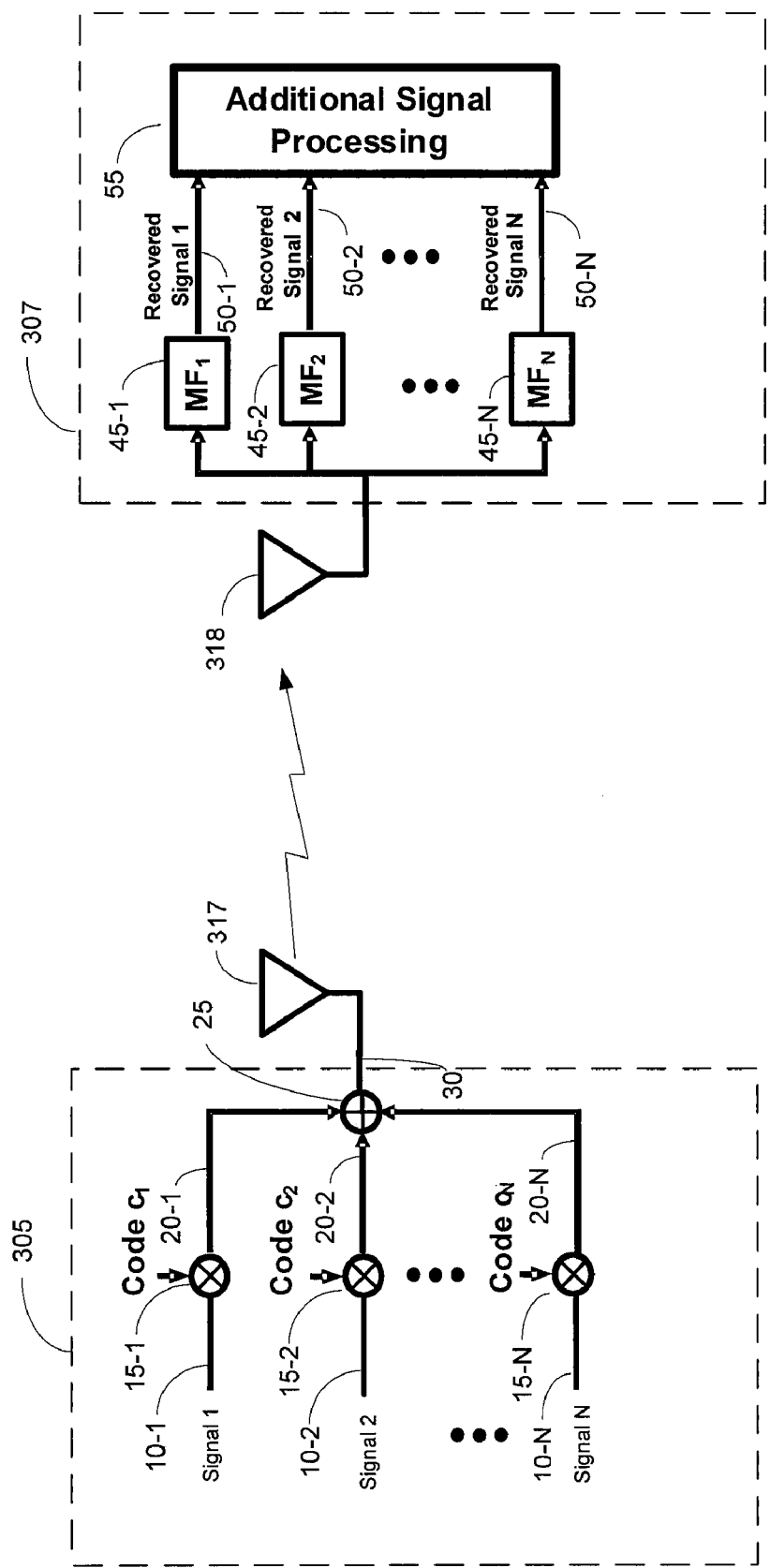

To transmit the combined signal 30 across the shared medium 335, the system may include components (not shown) for converting the combined signals 30 into a form that can be transmitted across the shared medium 335. For example, when the shared medium 335 is air, the system may include an RF antenna and associated hardware at each end of the shared medium 335. FIG. 3A shows an example in which the shared medium 335 comprises air and the system comprises antennas 317, 319 at each end of the shared medium 335 for transmitting the combined signal 30 wirelessly across the shared medium 335.

In this embodiment, the code-modulators 15-1 to 15-N distinguish the inputted signals 10-1 to 10-N with unique codes before they are combined by signal summer 25 into combined signal 30. The signals 10-1 to 10-N may come from multiple sensors (not shown in FIG. 3), e.g., microelectrodes, gas/chemical sensors, tactile sensors, etc. The combined signal 30 is then transmitted across the shared medium 335 to the second integrated circuit 307. In the second integrated circuit 307, each signal is recovered by the matched filter 45-1 to 45-N containing its corresponding code. The recovered signals 50-1 to 50-N are then inputted to additional signal processing 55 for further processing.

Figure 4:
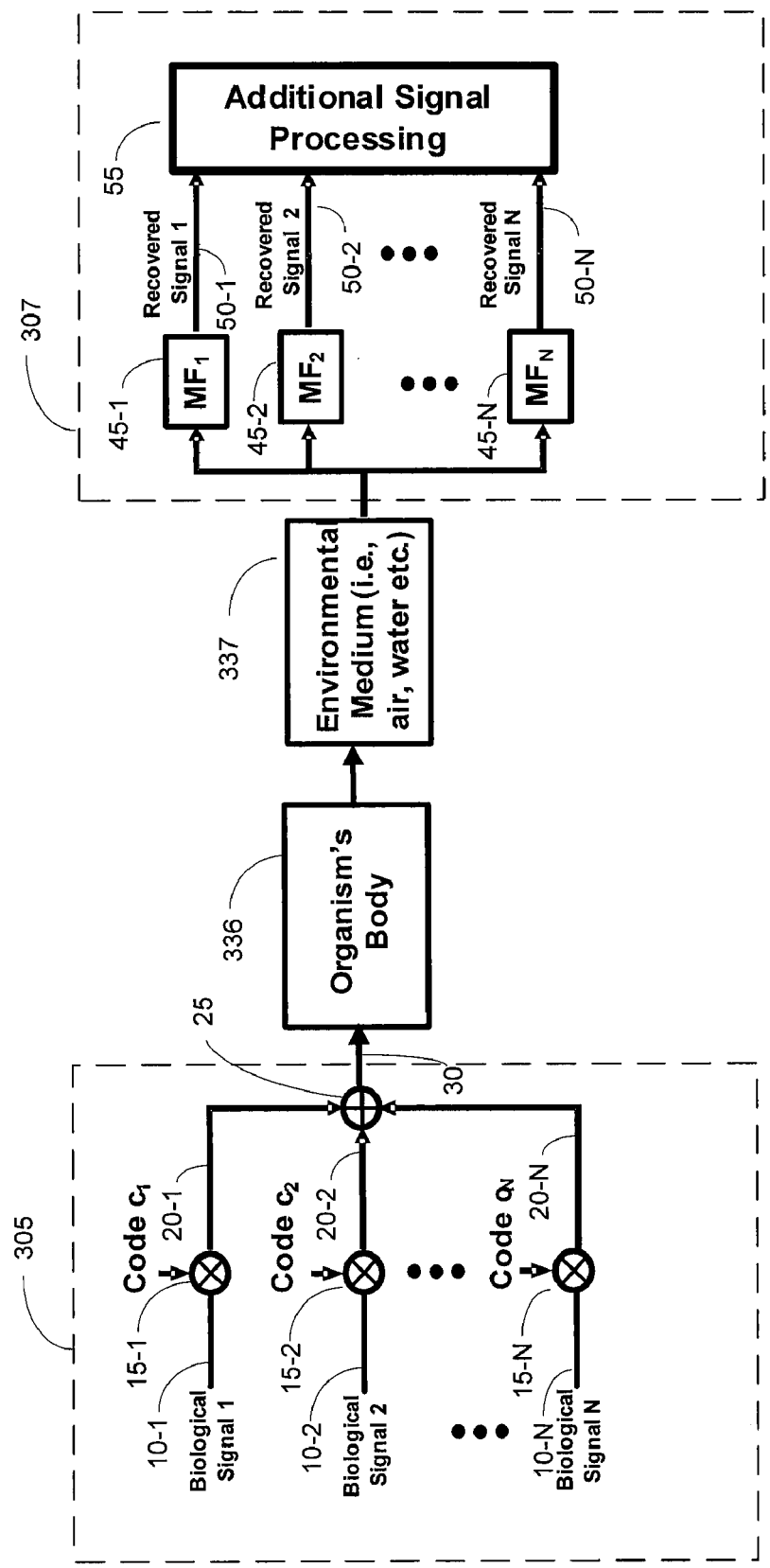
FIG. 4 shows block diagram of a multi-signal system where the shared medium comprises an organism's body and an environmental medium according to an embodiment of the invention.

FIG. 4 shows an exemplary embodiment, in which the shared medium comprises an organism's body 336 and an environmental medium 337, e.g., air, water, etc. This embodiment may be used in wireless implants for biomedical applications. For example, sensors (not shown in FIG. 4) and the first integrated circuit 305 may be part of a unit that is implanted in an organism for taking measurements within the organism. For example, the sensors may comprise microelectrodes for measuring electrical activity in the organism. In an exemplary embodiment, the multi-channel signals within the organism are code-modulated and summed into the combined signal 30. The combined signal 30 is transmitted across the organism's body 336 and environmental medium 337 to a central processing unit, which uses the matched filters 45-1 to 45-N to recover the individual signals for further processing.

Figure 5:
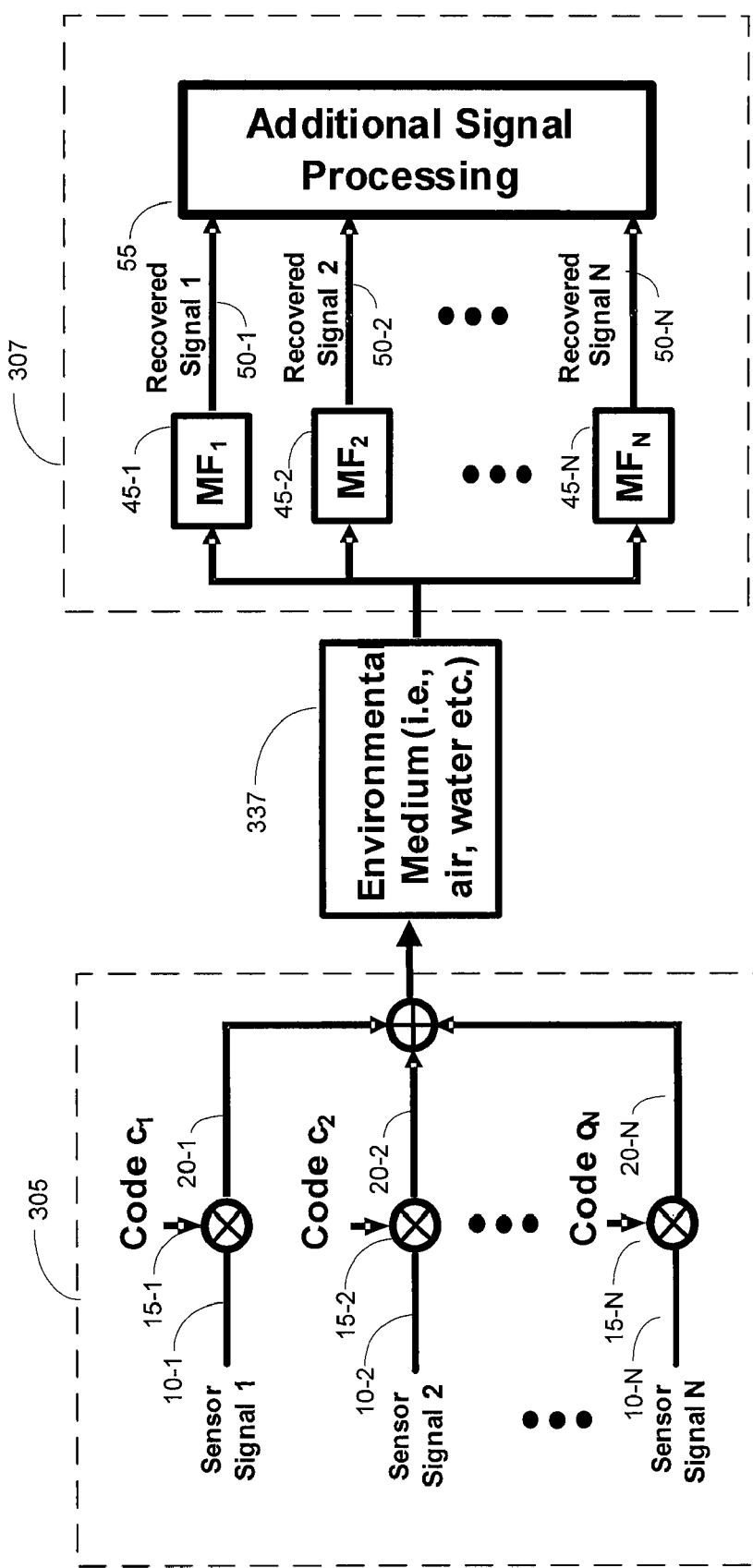
FIG. 5 shows block diagram of a multi-signal system where the shared medium comprises an environmental medium according to an embodiment of the invention.

FIG. 5 shows an exemplary embodiment, in which the shared medium 335 comprises an environmental medium 337, e.g., air, water, etc. This embodiment may be used in wireless sensor applications. In an exemplary embodiment, the sensed multi-channel signals are code-modulated and summed within the first integrated circuit 305 into the combined signal 30. The combined signal is transmitted across the environmental medium 337 to a central processor unit, which uses the matched filters 45-1 to 45-N to recover the individual signals from the combined signal for further processing.

Figure 6:
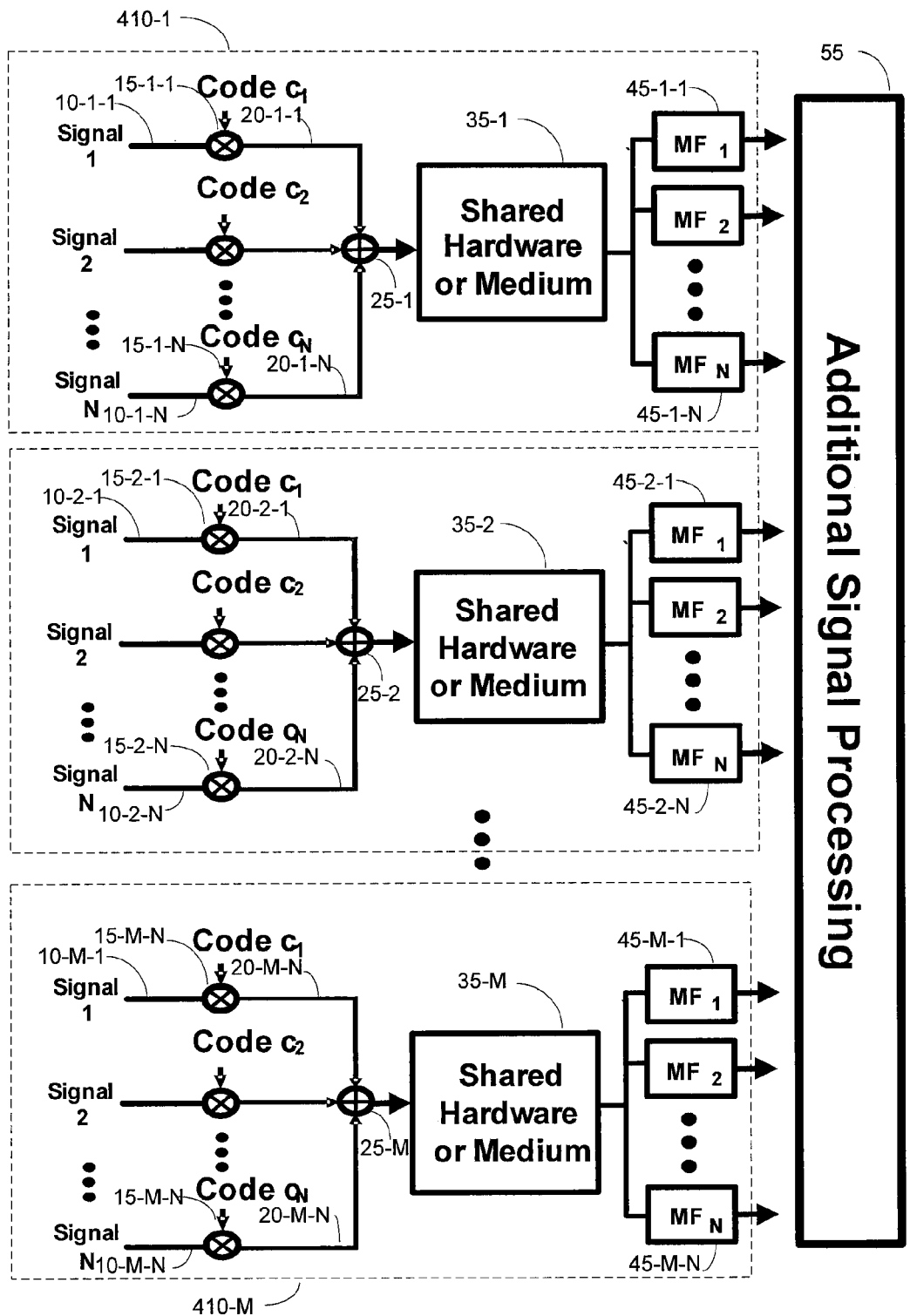
FIG. 6 shows block diagram of a multi-signal system employing a clustering code-modulating architecture according to an embodiment of the invention.

FIG. 6 shows a multi-signal system employing a clustering code-modulating architecture according to an embodiment of the present invention. In this embodiment, M*N input signals 10-1-1 to 10-M-N are grouped into M clusters 405-1 to 405-M with each cluster containing N signals. Each cluster 405-1 to 405-M is similar to the configuration shown in FIG. 1 and comprises N code-modulators 15-1-1 to 15-N-M, a signal summer 25-1 to 25-M, and N matched filters 45-1-1 to 45-M-N. The recovered signals of the M clusters are inputted to additional signal processing 55 for further processing.

The clusters may be integrated on the same chip or on different chips. Although the clusters are shown having the same numbers of signals they may have different numbers of signals. The goal of the clustering architecture is to break down a large number of input signals into manageable smaller numbers. Each cluster operates in a similar manner as the configuration shown in FIG. 1 and can also serve the same applications.

Figure 7:
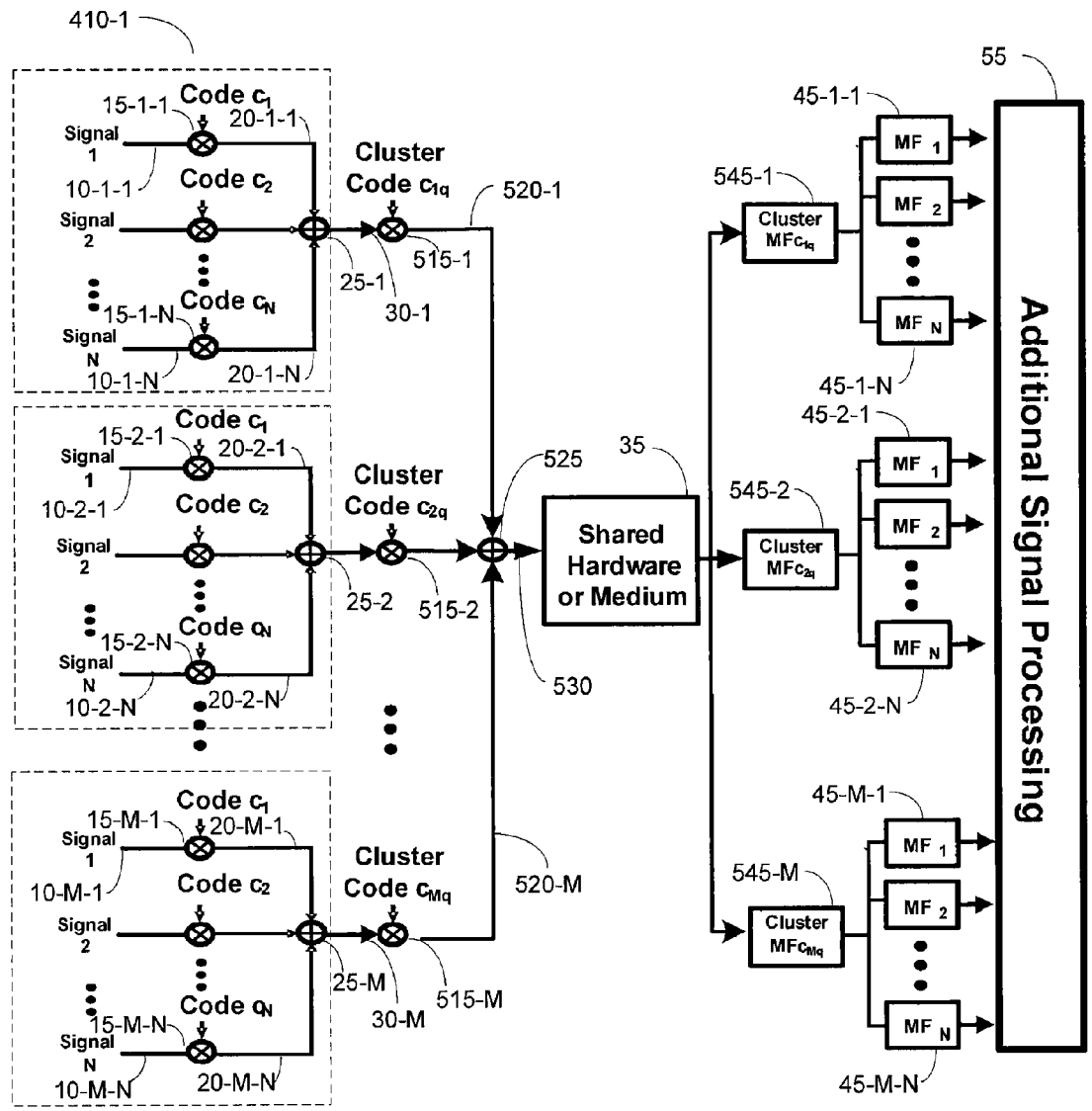
FIG. 7 shows block diagram of a multi-signal system employing a clustering-tree code-modulating architecture according to an embodiment of the invention.

FIG. 7 shows a multi-signal system employing a clustering-tree code-modulating architecture according to an embodiment of the present invention. In this embodiment, M*N input signals 10-1-1 to 10-M-N are grouped into M clusters 410-1 to 410-M with each cluster containing N signals. Each cluster 410-1 to 410-M comprises N code-modulators 15-1-1 to 15-N-M and a signal summer 25-1 to 25-M that combines the N code-modulated signal 20-1-1 to 20-N-M within the cluster into a combined signal 30-1 to 30-M. The combined signal 30-1 to 30-M of each cluster is code-modulated with a unique code $C_{1q}$ to $C_{Mq}$ by a cluster code-modulator 515-1 to 515-M. The code-modulated signals from the cluster code modulators 515-1 to 5154-M are then combined by a signal summer 530 into combined signal 530. The combined signal 530 allows the M*N input signals 10-1-1 to 10-M-N to propagate through a single shared hardware or medium 535 in a shared path.

On the other side of the shared hardware or medium 535, cluster matched filters 545-1 to 545-M are used to recover the combined signals of the clusters 410-1 to 410-M. For example, cluster matched filter 545-1 contains a code corresponding to the code of cluster code-modulator 515-1 to recover the corresponding combined signal. The recovered combined signal from each cluster matched filter 545-1 to 545-M is inputted to a cluster of N matched filters 45-1-1 to 45-M-N to recover the individual signals. For example, matched filters 45-1-1 to 45-1-N contain codes corresponding to the codes of code-modulators 15-1-1 to 15-1-N to recover the individual signals of cluster 410-1. The recovered signals are then inputted to additional processing 55 for further processing.

The clusters may be integrated on the same chip or on different chips. Although the clusters are shown having the same numbers of signals they may have different numbers of signals. The goal of the clustering-tree architecture is to break down a large number of input signals into manageable smaller numbers. Each cluster operates in a similar manner as the configuration shown in FIG. 1 and can also serve the same applications.

Figure 8:
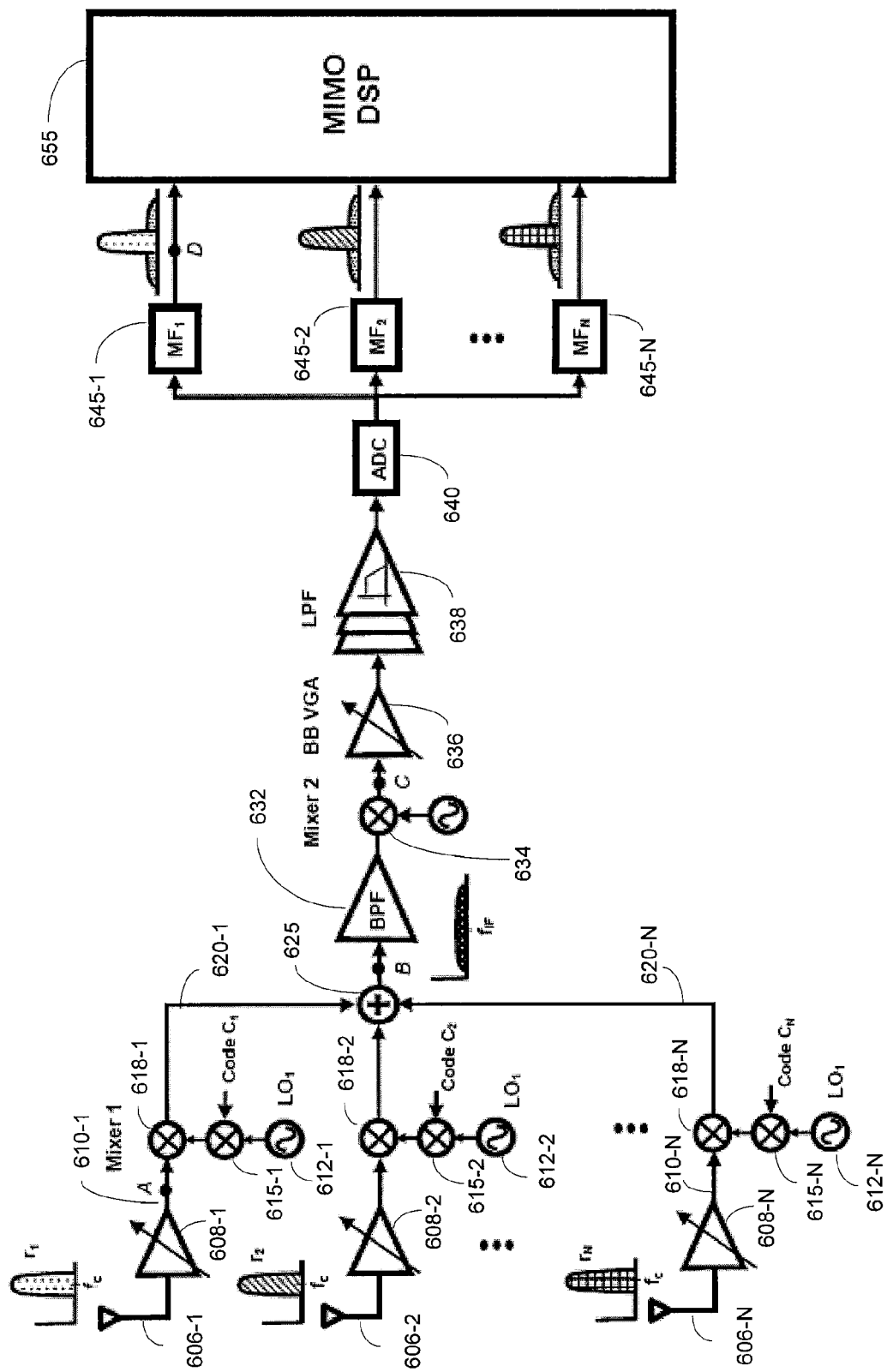
FIG. 8 shows block diagram of a multi-antenna receiver according to an embodiment of the invention.

FIG. 8 shows a code-modulated path-sharing multi-antenna (CPMA) receiver according to an embodiment of the present invention. In this embodiment, the received antenna signals 610-1 to 610-N are each modulated by a unique code $C_1$ to $C_N$ to distinguish the different antenna signals. The code-modulated antenna signals are then combined and processed by shared-path blocks, e.g., shared RF and/or baseband (BB) blocks and an analog to digital converter (ADC). After shared processing, the distinct antenna signals are recovered by matched filters 645-1 to 645-N for further processing, e.g., in the digital domain. By processing the combined signal using shared blocks, the multi-antenna receiver greatly reduces power consumption and chip area compared to prior art systems, in which RF and BB blocks are duplicated for each antenna signal. Further, the shared block reduces complexity by eliminating the coupling between components in duplicated blocks. The multi-antenna receiver can accommodate spatial multiplexing, spatial diversity and beamforming for multiple-input-multiple-output (MIMO) systems. Although FIG. 8 shows a super-heterodyne version of the exemplary CMPA receiver, the operation principles apply readily to direct conversion, low intermediate frequency (IF), and image-reject receivers, as well.

The exemplary multi-antenna receiver in FIG. 8 comprises multiple antennas 606-1 to 606-N for receiving N antenna signals 610-1 to 610-N. The multi-antenna receiver further comprises a low noise amplifier (LNA) 608-1 to 608-N coupled to each antenna. The LNAs 608-1 to 608-N amplify the received signals so as to reduce the noise contribution of subsequent stages. In addition, the LNAs 608-1 to 608-N provide variable gain in order to equalize all antenna signals for proper signal combination. The variable gain may be controlled through an automatic gain control (AGC) loop.

The multi-antenna receiver also comprises a mixer 618-1 to 618-N coupled to each antenna 606-1 to 606-N. Each mixer 618-1 to 618-N down converts the corresponding antenna signal to an intermediate frequency (IF) using a common local oscillator signal $LO_1$ 612-1 to 612-N and code-modulates 615-1 to 615-N the antenna signal with a unique code $C_1$ to $C_N$ to distinguish the corresponding antenna signal from the other antenna signals. An exemplary implementation of the mixers is provided below. The multi-antenna receiver also comprises a signal summer 625 for combining the code-modulated IF signals into combined signal 630, in which the signal corresponding to each antenna is distinguished from the other signals by its unique code.

The rate of the code, also known as the chip rate, is greater than the data rate by a factor of $G=T_d/T_c$, where $T_d$ is the period of each data symbol and $T_c$ is the code, or chip, period. G is known as the processing gain, or spreading factor, and is commonly an integer value. Because the data is multiplied by a code whose rate is G times higher than the data rate, the result is a data signal whose bandwidth is spread by G, as illustrated at point B in FIG. 8.

The multi-antenna receiver further comprises shared blocks for processing the combined signal in a shared path. As shown in the example in FIG. 8, the shared blocks may include a band pass filter (BPF) 632, a second mixer 634 for down converting the combined signal to baseband, a baseband variable gain amplifier (BB VGA) 636 for amplifying the combined signal to the full scale of the ADC, a low pass filter (LLP) 638 to avoid aliasing, and an analog to digital converter (ADC) 640 to sample and convert the combined signal into digital form. In practice, a complex signal is split into in-phase (I) and quadrature (Q) paths during downconversion to baseband for separate detection of I and Q components; however, FIG. 8 shows a single path for ease of illustration.

The receiver further comprises digital multiple matched filter (DMFs) 645-1 to 645-N, where each matched filter contains a code corresponding to one of the unique codes for recovering the corresponding signal from the combined signal. The DMFs may be comprised of registers, adders and multipliers with pre-programmed reference coefficients corresponding to the desired code. DMFs dissipate zero static power compared to much more power hungry analog circuitries with constant bias currents, which have been removed as a result of path sharing in the exemplary CPMA receiver.

The mixers 618-1 to 618-N, code modulators 615-1 to 615-N, shared blocks and matched filters 645-1 to 645-N may all be integrated on the same chip, e.g., using a CMOS process.

Figure 9:
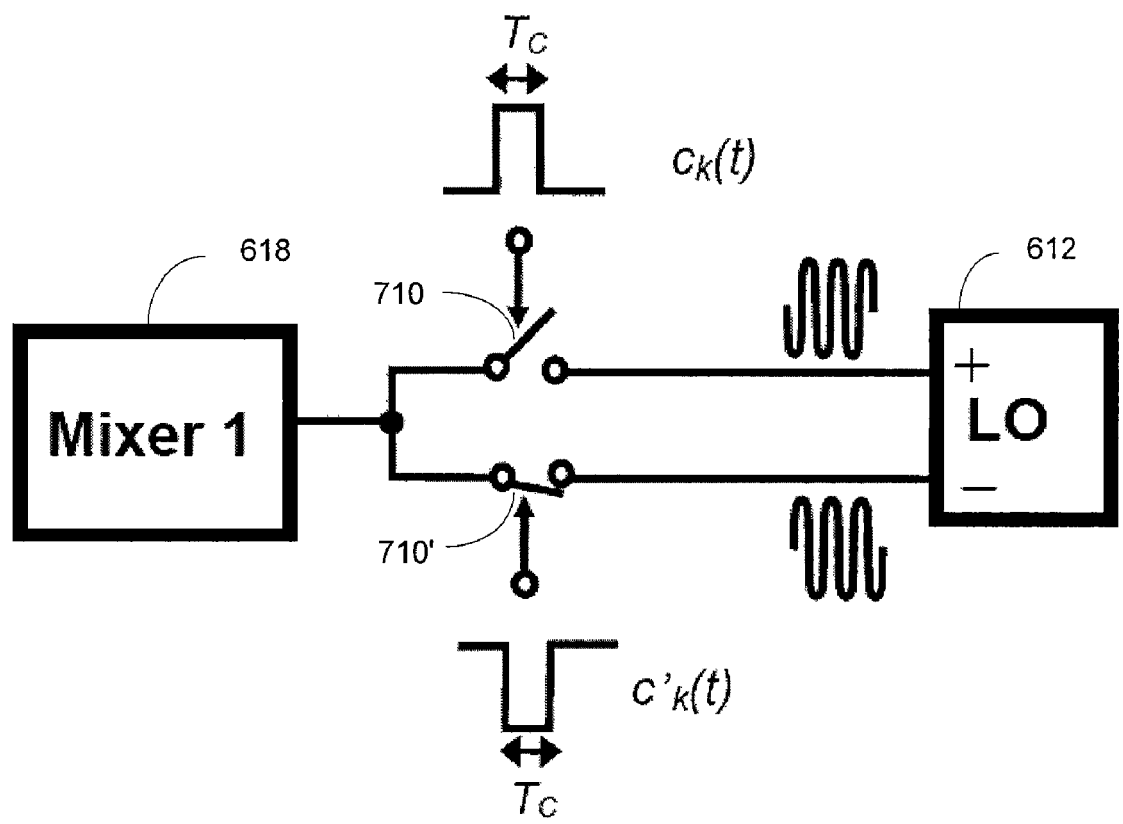
FIG. 9 shows a block diagram of a code modulator according to an embodiment of the invention.

FIG. 9 shows an exemplary implementation of a simple BPSK modulator for each branch. In this embodiment, the modulator comprises two switches 710 and 710' that are coupled to the positive and negative outputs of a differential local oscillator signal $LO_1$ 612, respectively. Switch 710 is driven by binary code $c_k(t)$ while switch 710' is driven by its inverse $c'_k(t)$. Preferably, the binary code for each branch is unique to distinguish the corresponding antenna signal from the different antenna signals. The switches 710 and 710' code modulate the local oscillator signal $LO_1$, which is then feed to the first mixer 618. The two switches 710 and 710' may be implemented using two NFETs with the binary code driving the gate of NFET 710 and its inverse driving the gate of the other NFET 710'.

Figure 10:
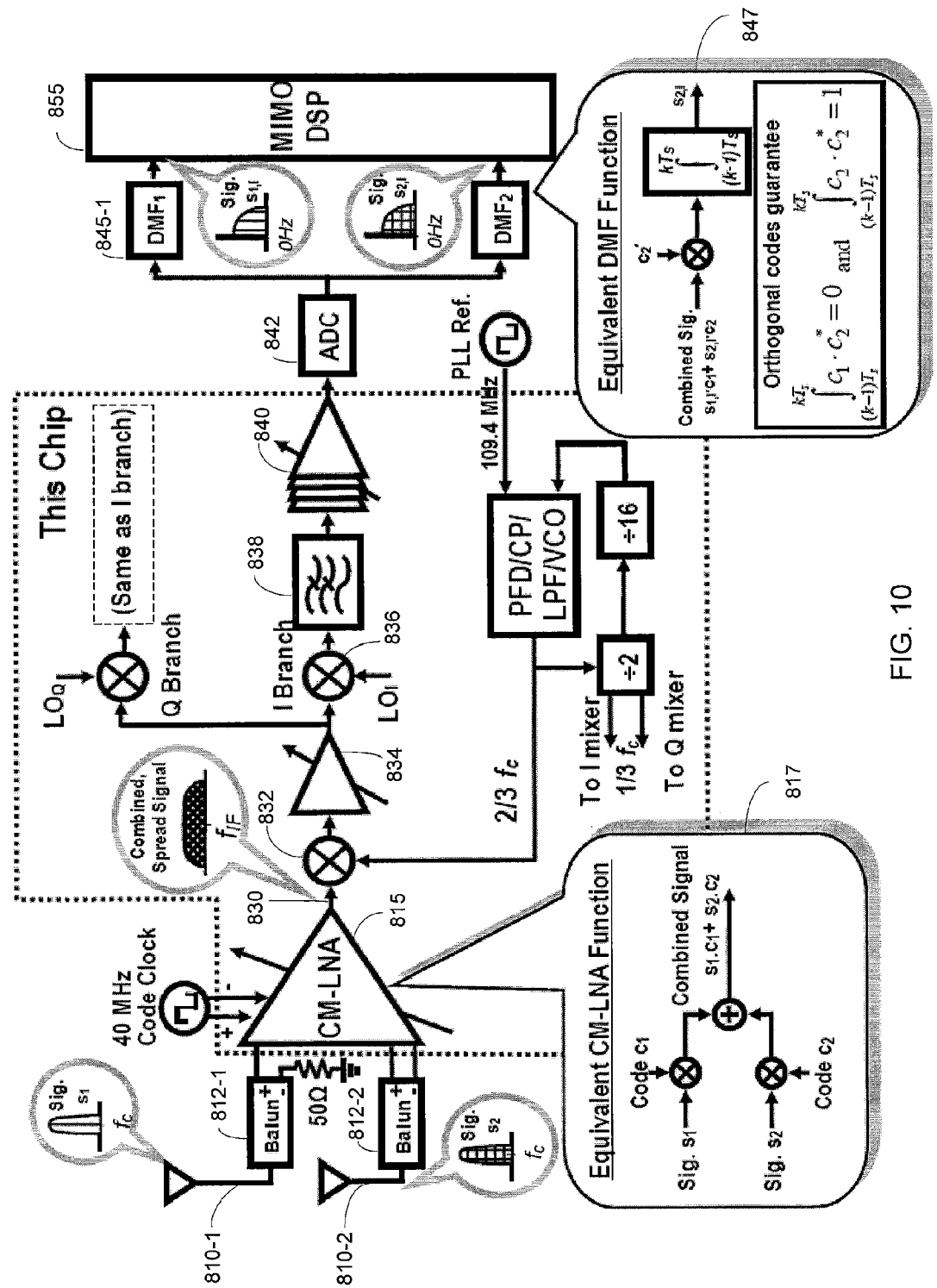
FIG. 10 shows a block diagram of a multi-antenna receiver according to another embodiment of the invention.

FIG. 10 shows an exemplary CPMA receiver front-end architecture that enables sharing of RF, baseband, and ADC blocks among multi-antenna signals. The mutual orthogonality of code-modulated signals allows signal combination in the RF domain, while enabling full recovery of each signal in the baseband using digital matched filters (DMF). The recovered signal is then fed to the MIMO DSP for further processing.

The CPMA receiver front-end is capable of accommodating any multi-antenna scheme, including SM, SD (including OSTBC, MRC, and BF).

A prototype of the exemplary CPMA architecture has been implemented for the special case of a 5 GHz two-antenna super-heterodyne receiver comprising LNA, mixers, baseband LPFs, and VGAs, as depicted in FIG. 10.

First, the two antennas 810-1 and 810-2 receive signals $s_1(t)$ and $s_2(t)$, respectively, both centered at the same frequency $f_c$ and transmitted at the same data rate $1/T_s$. The received signals are modulated with data, e.g., using 64 QAM at a symbol rate of 20 MHz, or other data modulation and/or rate. Due to the coding method used, both signals go through baluns 812-1 and 812-2, and then enter a code-modulating LNA (CM-LNA) 815. Besides low noise amplification, the CM-LNA 815, multiplies orthogonal co Besides low noise amplification, the CM-LNA 815, multiplies orthogonal codes, $c_1(t)$ and $c_2(t)$, with RF signals $s_1(t)$ and $s_2(t)$, respectively. The resulting code-modulated signals are mutually orthogonal, and thus can be added, resulting in the combined signal $s_C(t)=s_1(t)\cdot c_1(t)+s_2(t)\cdot c_2(t)$. The equivalent function of the CM-LNA is shown in insert 817. The combined signal 830 is then fed to a single chain of RF, baseband, and ADC 842 blocks with split into In-phase (I) and Quadrature (Q) paths after down conversion to baseband. In the digital domain, $DMF_1$ and $DMF_2$ 845-1 and 845-2 fully recover $s_1(t)$ and $s_2(t)$, respectively, from the digitized form of $s_C(t)$ (cf. FIG. 10). For instance, $DMF_2$ 845-2 multiplies $s_C(t)$ by $c_2^*$ (complex conjugant of $c_2$) and integrates the result over $T_s$. The modulation with an orthogonal code-set allows $s_2$ to be fully recovered. The equivalent function of $DMF_2$ is shown in insert 847. The recovered signal is then input to the MIMO digital signal processor (DSP) 855 for processing. Although the example shown in FIG. 10 has two antennas, the CPMA receiver front-end can have any number of antennas.

Sections of the exemplary CPMA receiver front-end are discussed in more detail below.

Code Modulating Low Noise Amplifier (CM-LNA)

Figure 11:
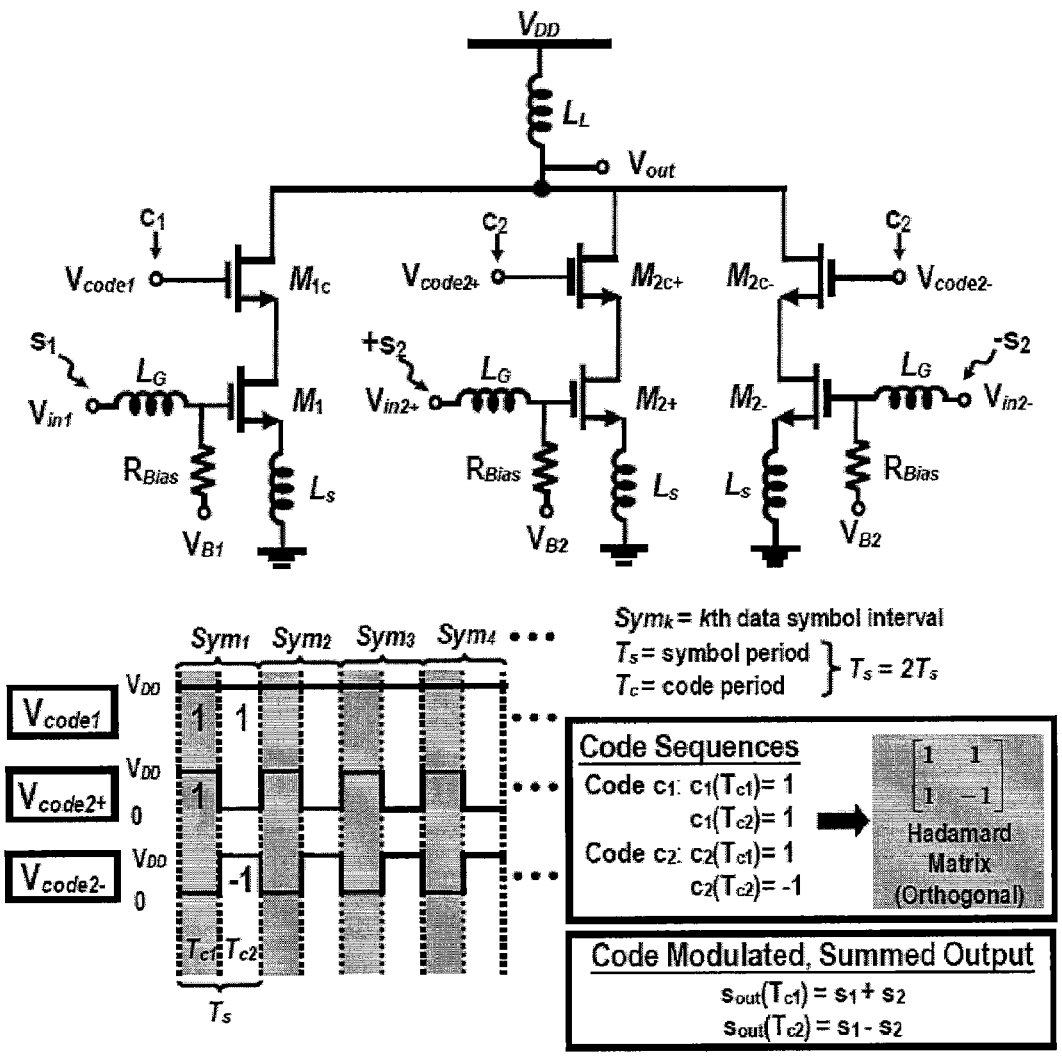
FIG. 11 shows a schematic of a code-modulating low-noise amplifier according to an embodiment of the invention.

FIG. 11 shows an implementation of the CM-LNA using MOSFETS $M_1$ to $M_2$, inductors $L_G$, $L_S$, and $L_L$, and bias resistors $R_{Bias}$. The inductors may be implemented using square spiral inductors on the top metal layer, and the resistors may be implemented using poly-resistors. The CM-LNA amplifies, code-modulates, and then combines the input signals into the combined signal. Each RF signal is input to an inductively degenerated cascode LNA, where the gate of the cascode device is controlled by its designated code sequence $c_1$ and $c_2$. The code set is a 2×2 Hadamard matrix in which its two constituent codes are mutually orthogonal. The code $c_1$ realizes the sequence [1, 1] by allowing $s_1(t)$ to appear at the output during both the first and second code periods, $T_{c1}$ and $T_{c2}$, respectively. In other words, the control signal for $s_1(t)$ is always "1", thereby obviating the need for the $s_1$ amplification path to be differential.

One output of the balun associated with $s_1(t)$ is thus resistively terminated. The code $c_2$ realizes sequence [1, −1] by allowing only $+s_2$ to appear at the output during $T_{c1}$, and only $-s_2$ to appear during $T_{c2}$. Since the code rate is twice the symbol rate, the code spreads the signal BW by a factor of 2. The code-modulated antenna signals are summed in the current domain at the output node, and are converted to voltage through a shared load inductor $L_L$, which contributes to the maximum gain at the resonant frequency. The CM-LNA has 9~25 dB of variable gain, maximum power dissipation of 14 mW, a minimum NF of 2.7 dB, and an IIP3 of −8 dBm for high-gain mode and −2 dBm for low-gain mode. Gain is controlled by gate bias voltages $V_{B1}$ and $V_{B2}$. Exemplary values for the inductors, resistors and bias voltages include: $L_G$=3.6 nH, $L_S$=0.5 nH, $L_L$=1.2 nH, $R_{Bias}$=7.4KΩ, and $V_B$=0.45:0.625 V.

Mixers and IF/BB Circuitry

Referring back to FIG. 10, the combined signal 830 is down-converted to the intermediate frequency $f_F$ by RF mixer 832 and baseband by IF mixers 836. The mixers may both be Gilbert-cell mixers. The RF mixer 832 uses inductive source degeneration to increase linearity, and a differential inductive load for higher gain. A differential IF VGA 834 provides two-step gain control at −7 and 7 dB by switching in or out a source degeneration resistor. The LPF 838 is a $5^{th}$ order 45 MHz $G_m$-C elliptic that passes the code-modulated signals (20 MHz antenna signals that are spread to 40 MHz due to code-modulation). Each LPF $G_m$-cell uses two input differential pairs to reduce complexity, power, and area by reducing the number of $G_m$ cells. Finally, a 4-stage OTA-based baseband VGA 840 provides variable gain from 0~55 dB.

Frequency Synthesizer

The integer-N frequency synthesizer, which is used to provide the local oscillator signals to the mixers, has a division ratio of 32 and a VCO center frequency of 3.5 GHz. The VCO is an all-PMOS cross-coupled pair LC-VCO with free-running phase noise of 119 dBc/Hz at 1 MHz offset. The outputs of the first divide-by-two generates the I/Q LO's at 1.75 GHz to drive the IF mixers 836.

Bandwidth Considerations

While the use of orthogonal codes zeroes the interference from undesired antenna signals, a set of codes each with sequence length of G per data symbol only allows G orthogonal codes to exist. Moreover, if N antenna signals must be accommodated while keeping all codes orthogonal, then $N \leq G$. Consequently, the BW of all blocks after code-modulation must be G times the data bandwidth. In analog baseband building blocks, the BW is almost linearly proportional to power dissipation. On the other hand, in RF/IF blocks following the CM-LNA, power dissipation is weakly affected by BW expansion. This is because, in RF/IF building blocks with small fractional BW, the power dissipation is dominated by the center frequency rather than the data BW. Consequently, compared with a conventional N-antenna receiver, power consumption will be reduced.

To combat the BW expansion, non-orthogonal codes can be used in the CPMA receiver. With code cross-correlations less than 0.6, bit error rate degradation can be kept at negligible levels. Examples of non-orthogonal codes can be found, for example, in the following references: (A) H. H. Nguyen and E. Shwedyk, "A new construction of signature waveforms for synchronous CDMA systems," *IEEE Trans. Broadcasting*, vol. 51, no. 4, pp. 520-529, December 2005. (B) P. Cotae, "Multicell spreading sequence design algorithm for overloaded S-CDMA," *IEEE Commun. Lett.*, vol. 9, no. 12, pp. 1028-1030, December 2005. (C) D. Shiung and J. Chang, "Enhancing the capacity of DS-CDMA system using hybrid spreading sequences," *IEEE Trans. Commun.*, vol. 52, no. 3, pp. 372-375, March 2004. Using non-orthogonal codes will result in a BW expansion of G (where $G \leq N$), thereby reducing the BW expansion factor compared to the case where fully-orthogonal codes are utilized.

Digital Matched Filters

The DMFs 845-1 and 845-2 may be essentially FIR filters whose tap coefficients are the complex conjugate of the code. The example in FIG. 10 has codes of length two, since each symbol period contains two code periods. Therefore, the DMF requires a minimum of two taps. The estimated power dissipation for a two-tap 40 MHz DMF in 0.18 μm CMOS is only 80 μW. Therefore, the addition of DMFs entails minimal increase in complexity.

Noise

In the CM-LNA, a question arises whether the use of switches $M_{2+}$ and $M_{2-}$-modulated by $c_2$ (see FIG. 11) will raise the NF the same way as the switching noise in current commuting mixers. Specifically, the white noise of the input transconductor and switches only contribute to the output noise when both switches are on simultaneously, a cyclostationary effect that occurs at twice the switching rate. In our case, the switching frequency is much lower than the CM-LNA's output spectrum around carrier frequency. As a result, much of the switching noise is filtered out by the resonant nature of the CM-LNA load, leading to negligible degradation on the NF.

Interferers

If the desired signal accompanies an adjacent channel interferer, code-modulation will spread both the signal and the interferer. This might in turn, result in spectrum overlap. Nonetheless, after the despreading operation in digital domain, the signal and interferer spectrums will no longer overlap, and an FIR filter eliminates the interferer.

A concern is that for the analog LPF 838 of FIG. 10 passing the spread signal, only a fraction of the interferer will be attenuated because of the spectral overlap. This results in a larger dynamic range for the ADC 842. For example, for the 802.11n standard with signal BW of 16.25 MHz and channel spacing of 20 MHz, assuming a spreading factor of 2 for the signal and its adjacent channel interferer, calculations show an SNR loss of 4.15 dB.

Figure 12:
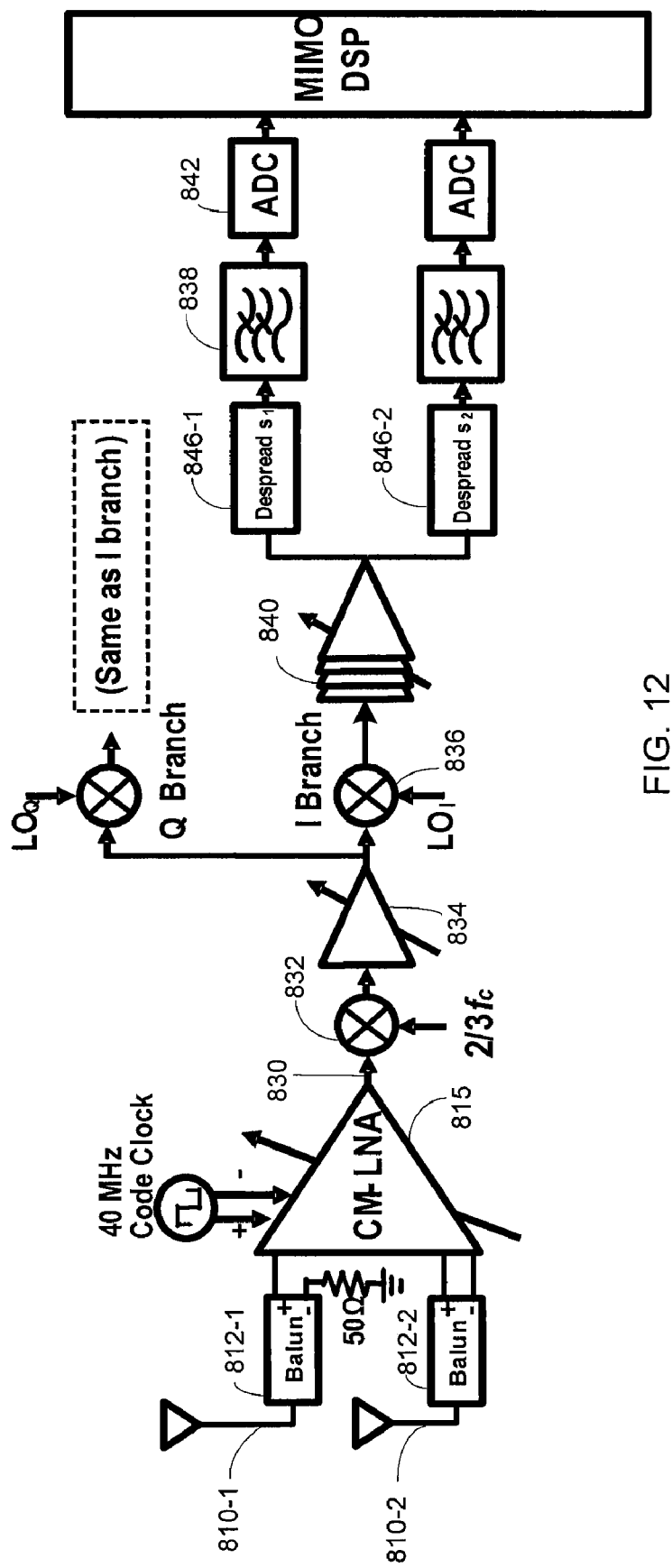
FIG. 12 shows a block diagram of a modified receiver to alleviate interferer and BW requirements according to an embodiment of the invention.

A slightly modified CPMA architecture, shown in FIG. 12, can eliminate the above problem by despreading 846 the signal and interferer before the LPF 838 and ADC 842. This approach also solves the BW expansion issue discussed above. The trade-off is that a smaller number of blocks are shared among the antennas.

In the foregoing specification, the invention has been described with reference to specific embodiments thereof. It will, however, be evident that various modifications and changes may be made thereto without departing from the broader spirit and scope of the invention. For example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A multi-signal system comprising:
a plurality of M clusters, wherein each cluster comprises:
a plurality of first code-modulators for receiving a plurality of input signals, wherein each first code-modulator is configured to modulate one of the input signals with a unique code; and
a first signal summer coupled to the first code-modulators, wherein the signal summer combines the code-modulated signals from the first code-modulators into a first combined signal;
a plurality of cluster code-modulators, wherein each cluster code-modulator is coupled to one of the clusters and is configured to code-modulate the first combined signal from the corresponding cluster with a unique code;
a second signal summer coupled to the cluster code-modulators, wherein the second signal summer is configured to combine the code-modulated signals from the cluster code-modulators into a second combined signal, wherein the second combined signal is sent through shared blocks and/or a shared medium in a shared path;
a plurality of cluster matched filters, wherein each matched filter is configured to recover one of the first combined signals from the second combined signal; and
a plurality of first matched filters coupled to each cluster matched filter, wherein each first matched filter includes a code corresponding to the unique code of one of the input signals for recovering the corresponding input signal from the first combined signal.

2. The multi-signal system of claim 1, wherein the unique codes are based on a code-division multiple access (CDMA) coding scheme.

* * * * *